(12) United States Patent
Neal et al.

(10) Patent No.: US 8,910,980 B2
(45) Date of Patent: Dec. 16, 2014

(54) LIQUID-TIGHT FITTING

(71) Applicant: Thomas & Betts International, Inc., Wilmington, DE (US)

(72) Inventors: Alan Neal, Germantown, TN (US); Cong Thanh Dinh, Collierville, TN (US); Mark Drane, Germantown, TN (US); Bobby Norwood, Leoma, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 11 days.

(21) Appl. No.: 13/647,025

(22) Filed: Oct. 8, 2012

(65) Prior Publication Data

US 2013/0113209 A1    May 9, 2013

Related U.S. Application Data

(60) Provisional application No. 61/556,881, filed on Nov. 8, 2011.

(51) Int. Cl.
| | |
|---|---|
| *F16L 33/00* | (2006.01) |
| *F16L 33/18* | (2006.01) |
| *F16L 19/065* | (2006.01) |
| *F16L 33/22* | (2006.01) |
| *H02G 3/06* | (2006.01) |

(52) U.S. Cl.
CPC ............... *F16L 33/18* (2013.01); *F16L 19/065* (2013.01); *F16L 33/224* (2013.01); *H02G 3/0675* (2013.01)
USPC .......................................... 285/247; 285/249

(58) Field of Classification Search
USPC ........... 285/247, 243, 250, 151.1, 154.1, 393, 285/213; 174/653, 654, 659, 660
See application file for complete search history.

(56) References Cited

U.S. PATENT DOCUMENTS

| | | | | | |
|---|---|---|---|---|---|
| 3,006,664 | A | * | 10/1961 | Appleton et al. | ............. 285/248 |
| 3,424,853 | A | * | 1/1969 | Johnson | ......................... 174/359 |
| 3,492,410 | A | * | 1/1970 | Kelly | ............................. 174/78 |

(Continued)

FOREIGN PATENT DOCUMENTS

| | | |
|---|---|---|
| FR | 2 866 094 | 8/2005 |
| GB | 1 206 057 | 9/1970 |

OTHER PUBLICATIONS

Extended European Search Report issued Feb. 13, 2013 in corresponding European application No. 12190220.9; 9 pages.

*Primary Examiner* — Aaron Dunwoody

(74) *Attorney, Agent, or Firm* — Snyder, Clark, Lesch & Chung, LLP

(57) ABSTRACT

A liquid-tight fitting comprising a ground element including a ferrule and a tube that extends from the ferrule to receive a conduit, wherein the tube includes one or more protruding elements that each protrudes from the tube and provides grounding to the conduit, and wherein the ferrule includes a lip portion; a threading element including a first shaft having a circumference sufficient to receive the ferrule portion, wherein the first shaft includes threads; a sealing ring including an opening defined by a tapered portion to seat against the lip portion; and a nut including threads to be received by the first shaft, wherein as the nut is threaded with the first shaft, the sealing ring is compressed onto an outer surface of the wall of the conduit based on a pulling of the nut against the sealing ring toward the lip portion of the ferrule.

20 Claims, 25 Drawing Sheets

(56) References Cited

U.S. PATENT DOCUMENTS

| | | | |
|---|---|---|---|
| 3,603,912 A * | 9/1971 | Kelly | 439/273 |
| 3,647,934 A * | 3/1972 | Hurtt | 174/652 |
| 3,830,531 A * | 8/1974 | Burge | 285/239 |
| 4,000,918 A * | 1/1977 | Reker | 285/93 |
| 4,169,967 A * | 10/1979 | Bachle | 174/654 |
| 4,181,329 A | 1/1980 | Helm | |
| 4,358,079 A | 11/1982 | Navarro | |
| 4,468,535 A * | 8/1984 | Law | 174/669 |
| 4,490,576 A | 12/1984 | Bolante et al. | |
| 4,635,975 A | 1/1987 | Campbell | |
| 4,885,429 A | 12/1989 | Schnittker | |
| 4,889,368 A | 12/1989 | Laipply | |
| 4,900,068 A | 2/1990 | Law | |
| 5,059,747 A | 10/1991 | Bawa et al. | |
| 5,072,072 A | 12/1991 | Bawa et al. | |
| 5,131,692 A | 7/1992 | Lemons | |
| 5,553,901 A | 9/1996 | Serot | |
| 6,080,933 A | 6/2000 | Gretz | |
| 6,335,488 B1 | 1/2002 | Gretz | |
| 6,517,124 B1 | 2/2003 | Le Quere | |
| 6,538,201 B1 | 3/2003 | Gretz | |
| 6,555,749 B1 | 4/2003 | Pyron | |
| 6,616,194 B1 | 9/2003 | Gretz | |
| 6,642,451 B1 | 11/2003 | Gretz | |
| 6,663,145 B1 | 12/2003 | Lyall, III et al. | |
| 6,719,330 B2 * | 4/2004 | Brown et al. | 285/242 |
| 6,767,032 B1 | 7/2004 | Gretz | |
| 6,867,373 B2 | 3/2005 | West et al. | |
| 6,913,292 B2 | 7/2005 | Snyder, Sr. et al. | |
| 6,935,890 B1 | 8/2005 | Gretz | |
| 7,014,215 B2 | 3/2006 | Cooper et al. | |
| 7,183,486 B2 * | 2/2007 | Pyron et al. | 174/59 |
| 7,357,672 B2 * | 4/2008 | Montena | 439/584 |
| 7,644,958 B2 * | 1/2010 | Postler | 285/249 |
| 7,677,603 B2 | 3/2010 | Happel | |
| 7,735,876 B2 * | 6/2010 | Chiu | 285/207 |
| 7,841,630 B1 | 11/2010 | Auray et al. | |
| 7,900,970 B2 * | 3/2011 | Chiu | 285/207 |
| 7,914,048 B2 * | 3/2011 | Shemtov | 285/151.1 |
| 2007/0205601 A1 * | 9/2007 | Shemtov | 285/151.1 |

* cited by examiner

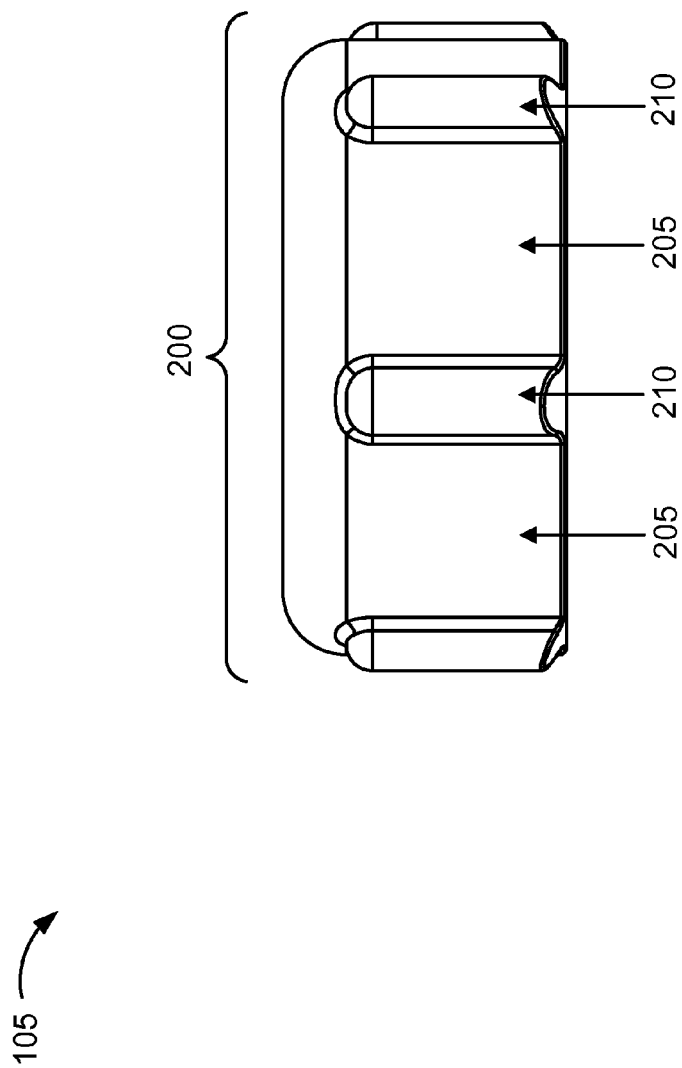

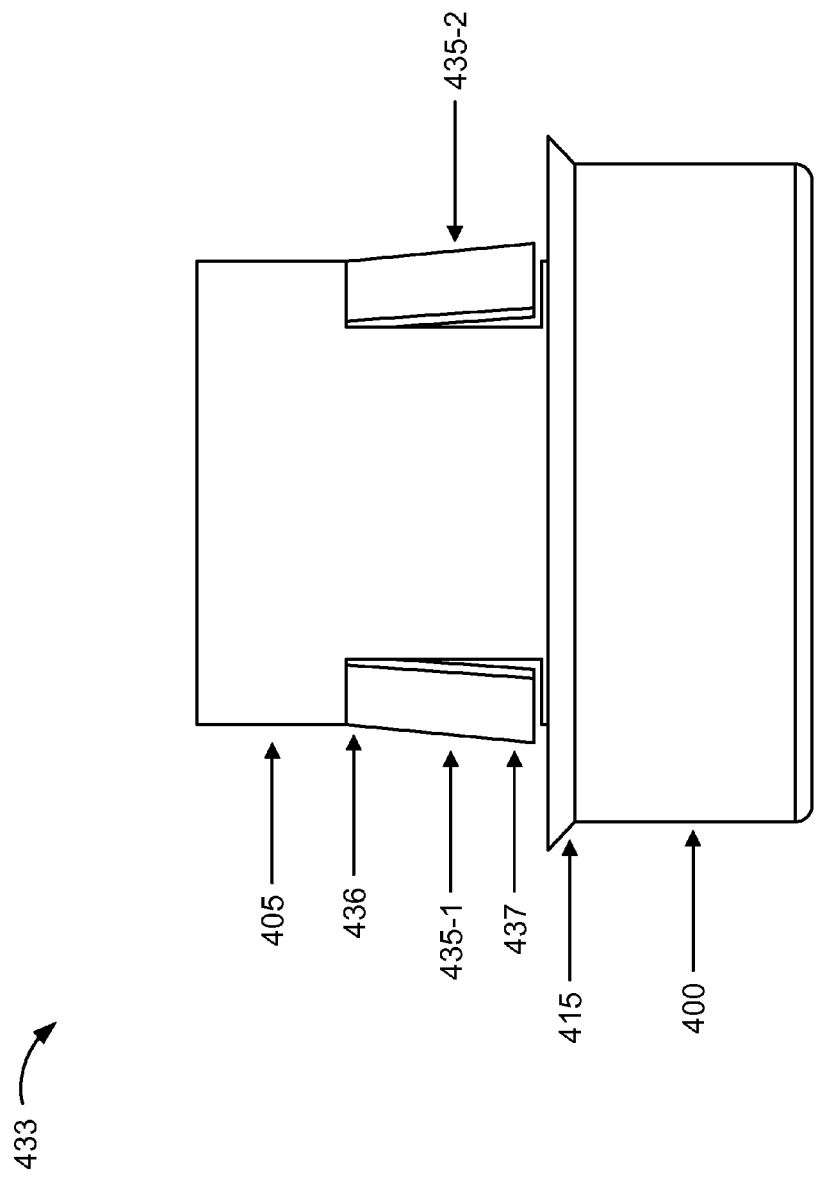

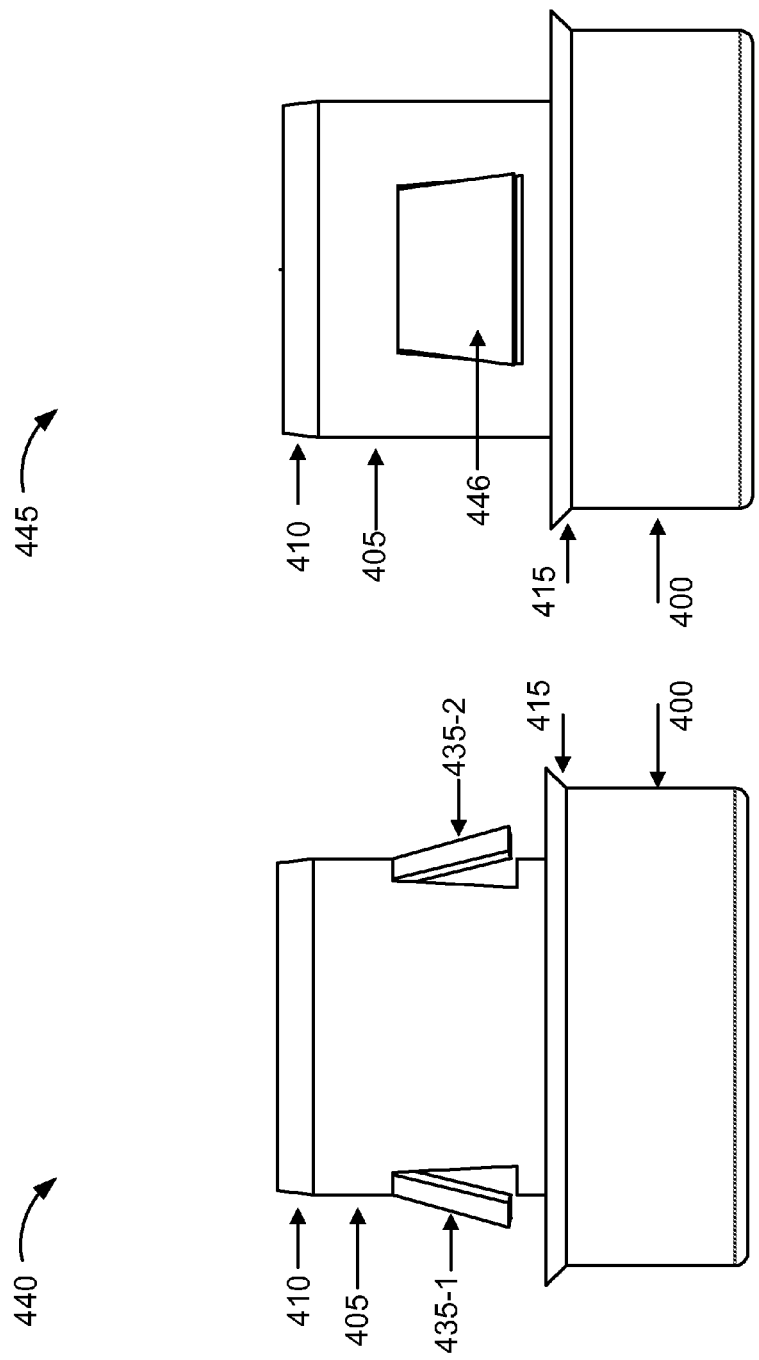

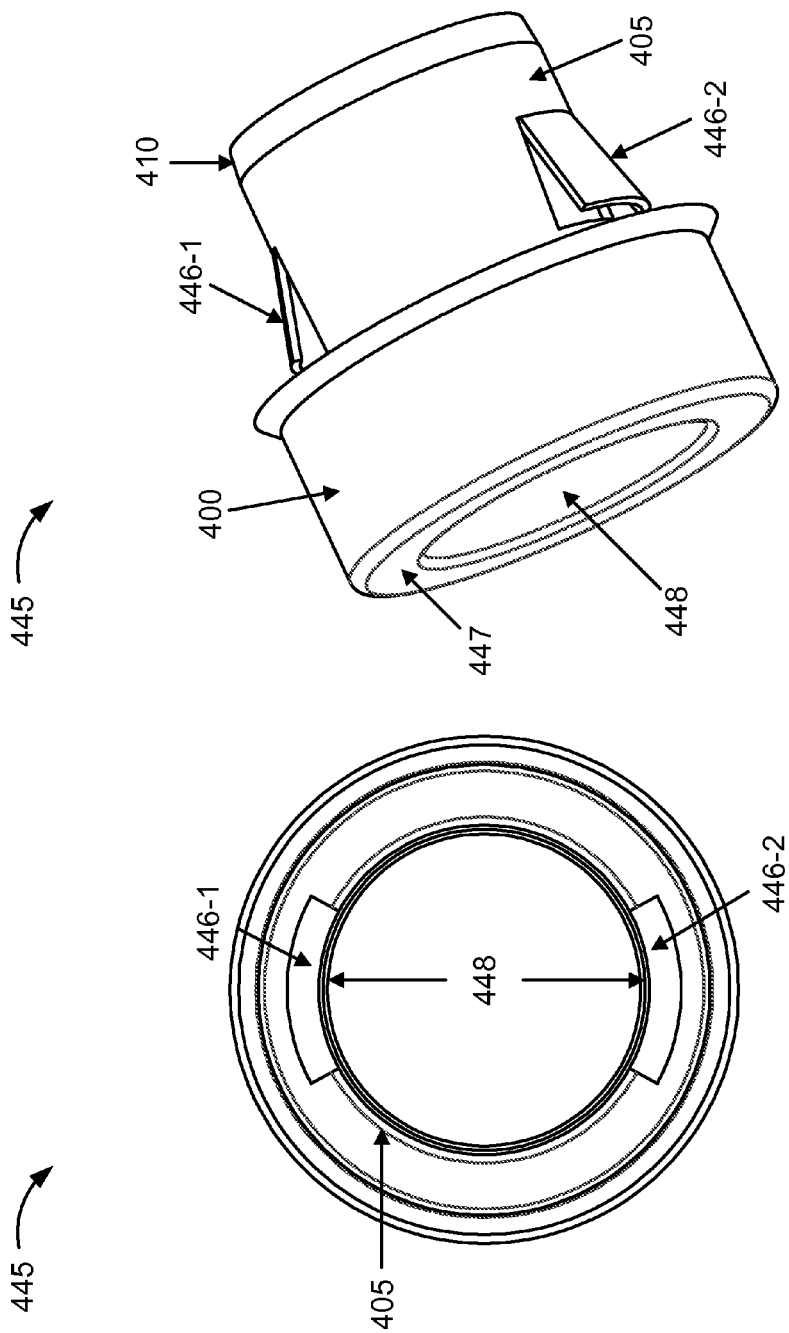

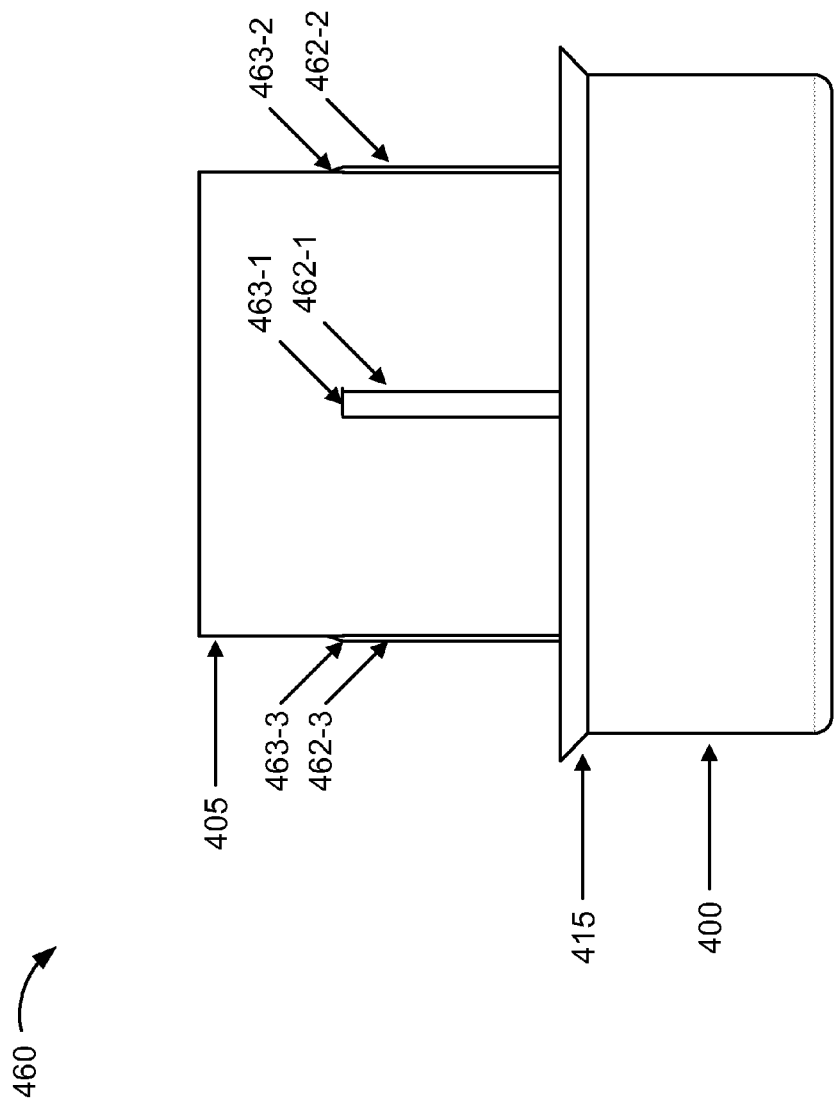

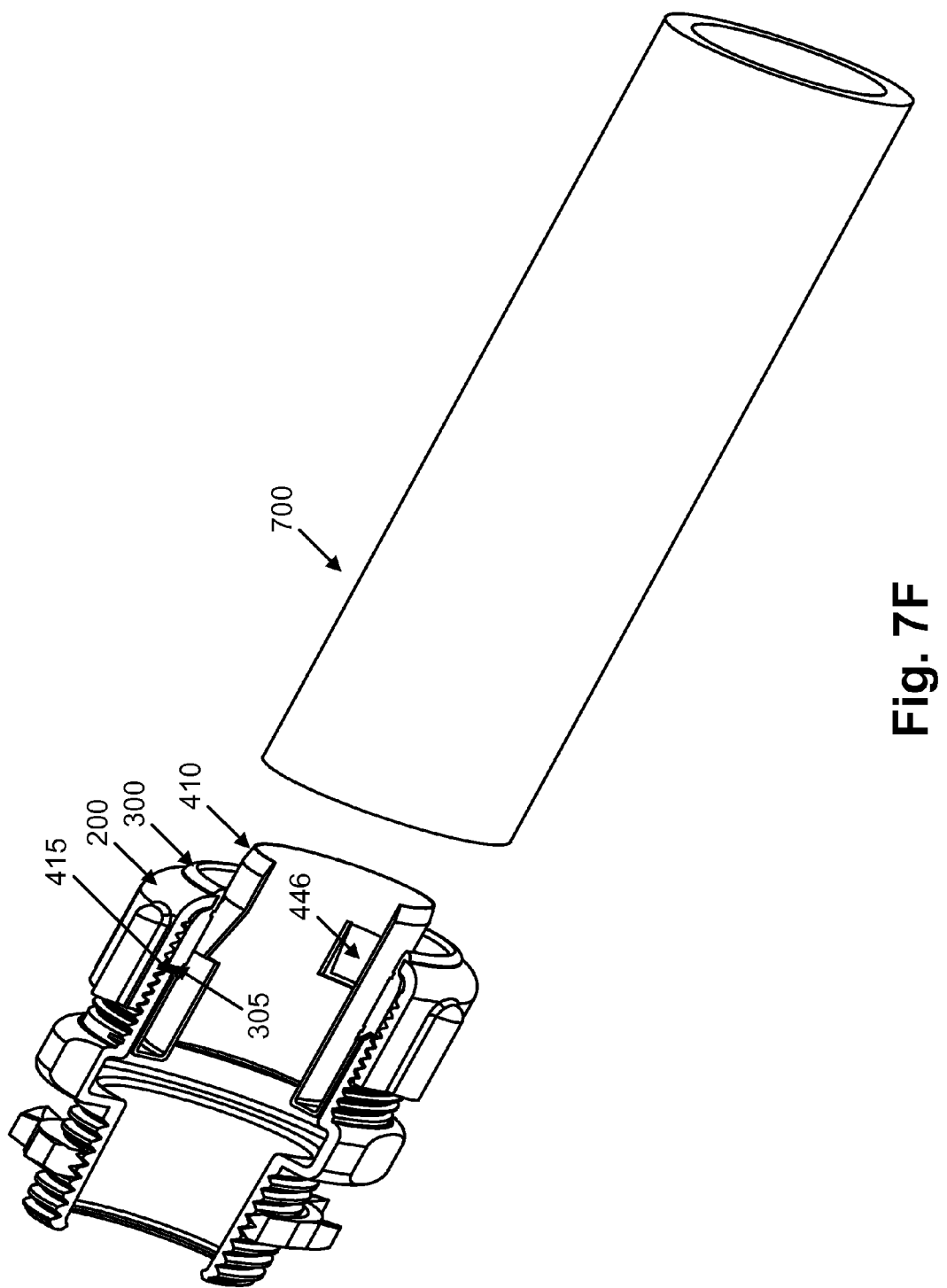

LIQUID-TIGHT FITTING

CROSS-REFERENCE TO RELATED APPLICATION

This application claims priority under 35. U.S.C. §119, based on U.S. Provisional Patent Application No. 61/556,881 filed Nov. 8, 2011, the disclosure of which is hereby incorporated by reference herein.

BACKGROUND

Conduits, such as flexible conduits, are used in a wide range of applications. Fittings, such as liquid-tight fittings, are designed to protect conduits from various types of environments, such as wet or corrosive environments. For example, liquid-tight fittings may be used in wastewater treatment applications, saltwater applications, petrochemical refining applications, and food processing applications.

BRIEF DESCRIPTION OF THE DRAWINGS

FIG. 2 is a diagram illustrating an exemplary embodiment of a gland nut;

FIGS. 4A-4L are diagrams illustrating exemplary embodiments of a ground element;

FIGS. 7A-7G are diagrams illustrating an exemplary embodiment of the liquid-tight fitting and a conduit.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to an exemplary embodiment, a liquid-tight fitting includes a ground element configured to receive a conduit. According to an exemplary embodiment, the ground element includes a tube that is shaped to receive an interior wall of a conduit. For example, the tube may be of a tubular shape including a wall having an interior surface and an exterior surface. According to an exemplary embodiment, the tube includes protruding elements disposed on the exterior surface. For example, the protruding elements may be disposed along a periphery of the exterior surface of the tube and outwardly protrude from the exterior surface of the tube. According to an exemplary embodiment, the protruding elements may take the form of ribs, tabs, or fins. According to an exemplary embodiment, the protruding elements provide a frictional engagement between the tube and the interior wall of the conduit when the conduit is received. According to an exemplary embodiment, the protruding elements ground the conduit.

According to an exemplary embodiment, the ground element includes a ferrule. According to an exemplary embodiment, the ferrule includes a lip portion that is shaped to receive a tapered portion of a sealing ring.

According to an exemplary embodiment, a liquid-tight fitting includes a sealing ring having teeth. According to an exemplary embodiment, the teeth are disposed along a perimeter of an inner ring surface of the sealing ring. According to an exemplary embodiment, the teeth protrude inwardly from the inner ring surface toward a center of a space defined by the inner ring surface. According to an exemplary embodiment, the teeth provide a liquid-tight seal between an exterior surface of the conduit and the liquid-tight fitting. According to an exemplary embodiment, the teeth are compressed onto the exterior surface of the conduit based on an interaction between a gland nut, the lip portion of the ground element, and the sealing ring, as described further below.

Figure 1:
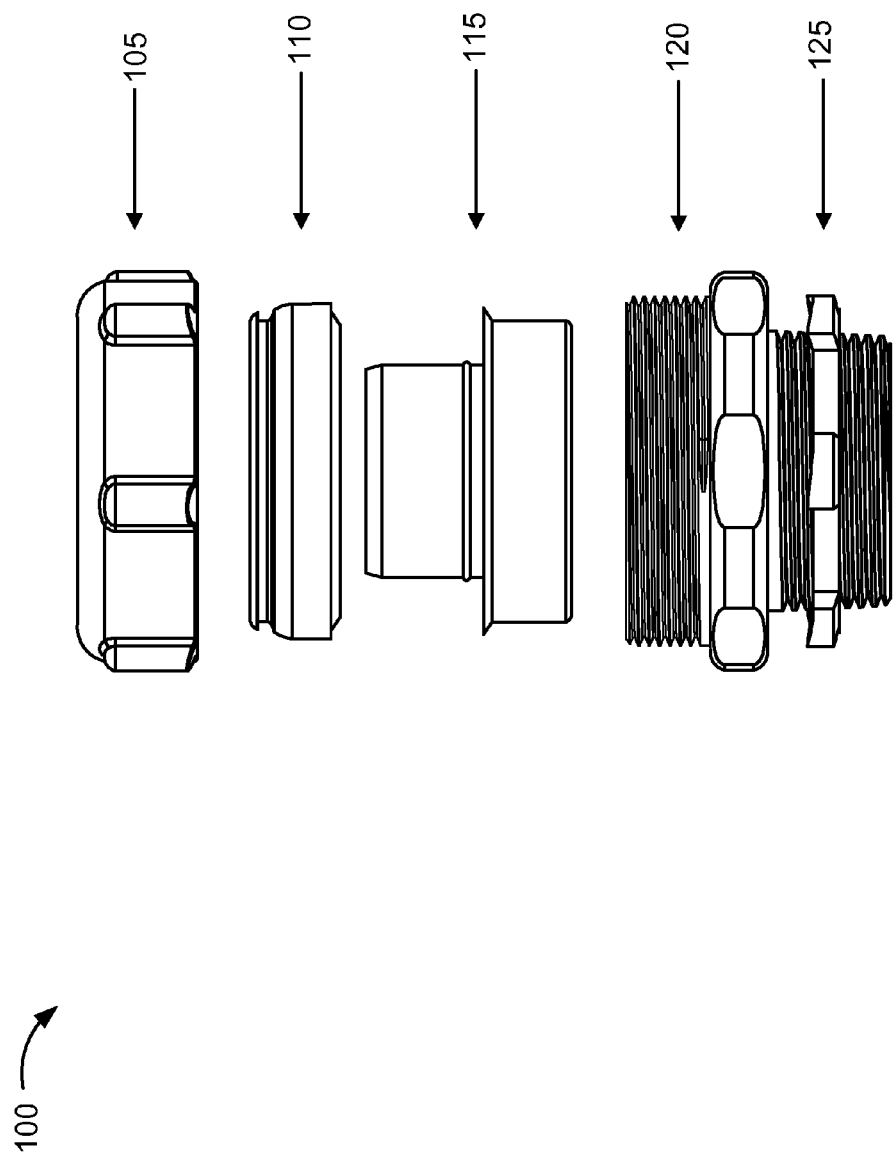
FIG. 1 is a diagram illustrating an exploded view of an exemplary embodiment of a liquid-tight fitting.

FIG. 1 is a diagram illustrating an exploded view of an exemplary embodiment of a liquid-tight fitting 100. As illustrated, liquid-tight fitting 100 includes a gland nut 105, a sealing ring 110, a ground element 115, a threading element 120, and a locknut 125.

FIG. 2 is a diagram illustrating a side view of an exemplary embodiment of gland nut 105. Gland nut 105 may be made from a metal (e.g., steel, etc.). The outer surface of gland nut 105 may be double-plated to minimize corrosion from contaminants.

As illustrated, according to an exemplary embodiment, gland nut 105 has an umbrella portion 200. Umbrella portion 200 may minimize or prevent contaminants (e.g., liquids, etc.) from collecting on the liquid-tight fitting 100 by diverting contaminants away from liquid-tight fitting 100. According to an exemplary embodiment, umbrella portion 200 urges sealing ring 110 and facilitates a compression of sealing ring 110, as described further below. According to an exemplary embodiment, gland nut 105 includes a series of indentations 205 and protrusions 210 along an exterior side surface of gland nut 105.

Figure 3A:
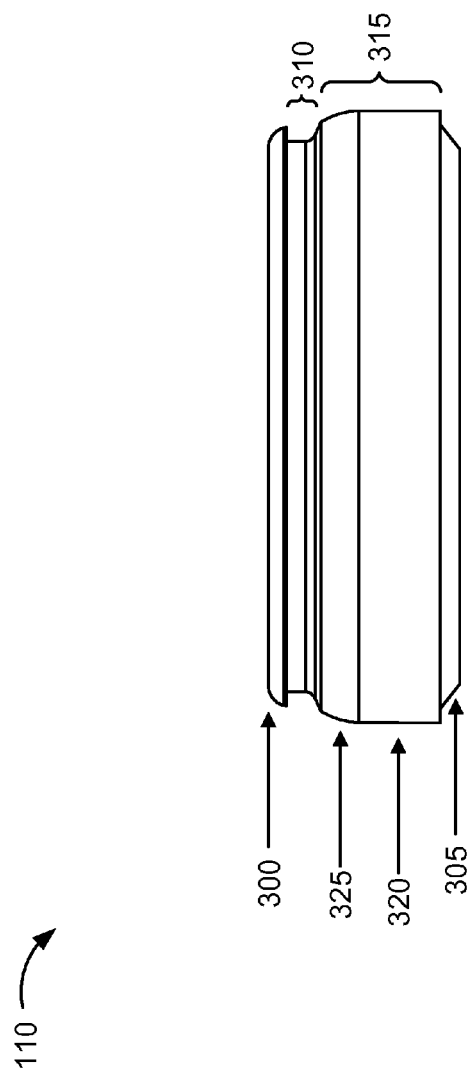
FIGS. 3A and 3B are diagrams illustrating an exemplary embodiment of a sealing ring.
Figure 3B:
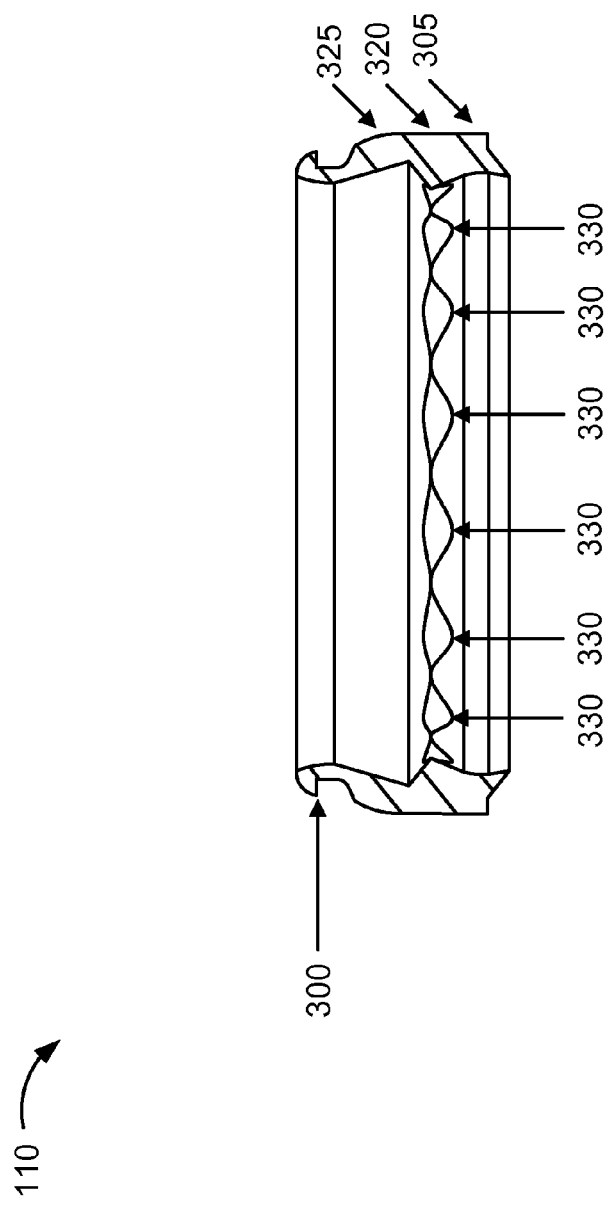

Gland nut 105 includes internal threading to be received by threading of threading element 120, as illustrated and described further below. Additionally, as illustrated and described further below, gland nut 105 compresses sealing ring 110 onto an exterior surface of a conduit FIGS. 3A and 3B are diagrams illustrating an exemplary embodiment of sealing ring 110. FIG. 3A is a side view of sealing ring 110. Referring to FIG. 3A, sealing ring 110 may be made from a plastic (e.g., nylon, etc.), rubber, a combination thereof, or other suitable material to provide ease of slippage onto or around a conduit.

Sealing ring 110 has a ring shape. According to an exemplary embodiment, a first end of sealing ring 110 includes a lip 300. Lip 300 arcs outwardly along a perimeter of a ring-shaped opening. A second end of sealing ring 110 includes a tapered portion 305. As further illustrated, sealing ring 110 includes a neck portion 310 and a main body portion 315 between lip 300 and tapered portion 305. Main body portion 315 includes a shaft portion 320 and a curved portion 325. According to an exemplary embodiment, the exterior surfaces of neck portion 310 and main body portion 315 have a contour substantially similar to an inner surface of gland nut 105.

FIG. 3B is a cross-sectional view of sealing ring 110. Referring to FIG. 3B, according to an exemplary embodiment, sealing ring 110 includes teeth 330 disposed on a portion of an inner surface of sealing ring 110 that defines an opening. Although FIG. 3B illustrates a portion of teeth 330, according to an exemplary embodiment, teeth 330 extend along the entire circumference of the portion of the inner surface (e.g., a ring of teeth 330). As illustrated, according to an exemplary embodiment, teeth 330 inwardly extend, in a radial fashion, from an inner surface of curved portion 325. According to other embodiments, teeth 330 may be disposed on an inner surface of other portions of sealing ring 110.

According to this example, teeth 330 have a V-shape. According to other embodiments, teeth 330 may be formed to have other shapes (e.g., a U-shape, a square-shape, a rectangle shape, etc.). According to an exemplary embodiment, teeth 330 may be made from rubber or other suitable material to provide a seal around the opening (and a conduit). According to an exemplary embodiment, teeth 330 may be co-formed with sealing ring 110.

Figure 3C:
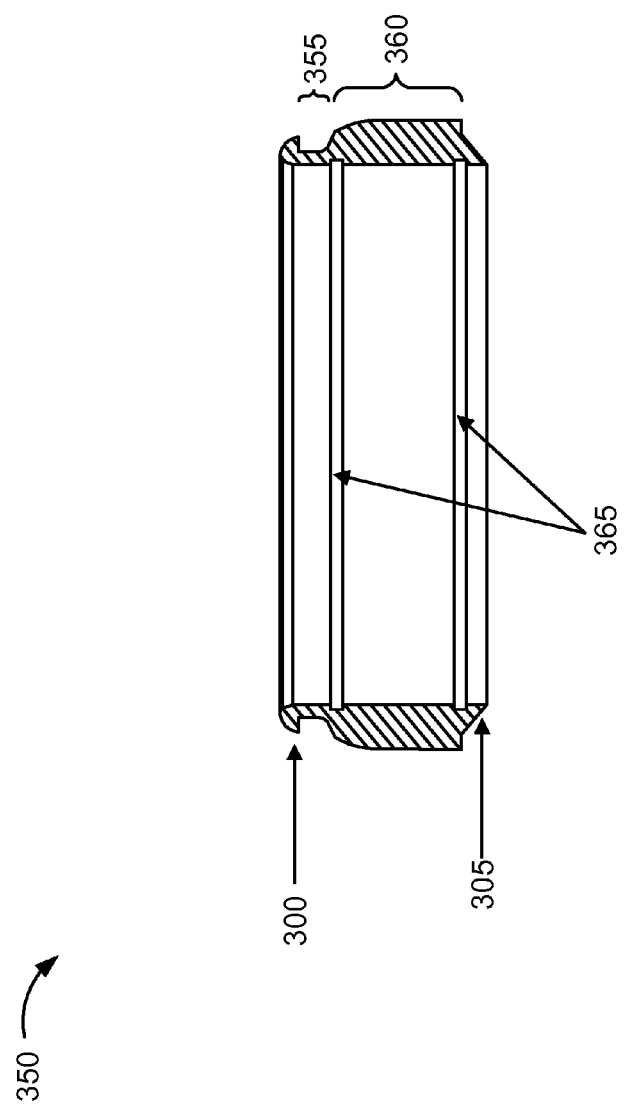
FIGS. 3C and 3D are diagrams illustrating another exemplary embodiment of a sealing ring.
Figure 3D:
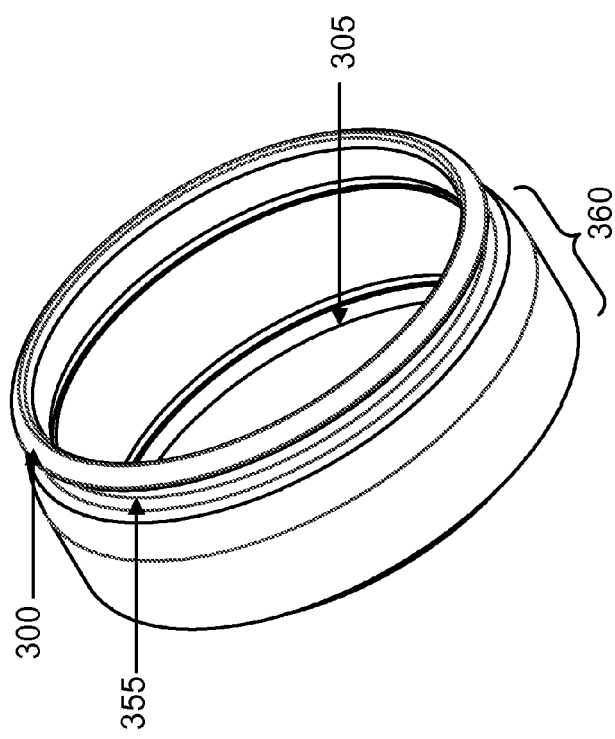

FIGS. 3C and 3D are diagrams illustrating another exemplary embodiment of a sealing ring 350. FIG. 3C is a cross-sectional view of sealing ring 350. Referring to FIG. 3C, sealing ring 350 includes lip 300 and tapered portion 305. Sealing ring 350 includes a neck portion 355 and a main body portion 360. Main body portion 360 includes ribs 365. According to this embodiment, sealing ring 350 does not include teeth 330. FIG. 3D is a perspective view of sealing ring 350. According to an exemplary embodiment, the exterior surfaces of neck portion 355 and main body portion 360 have a contour substantially similar to an inner surface of gland nut 105.

Figure 4A:
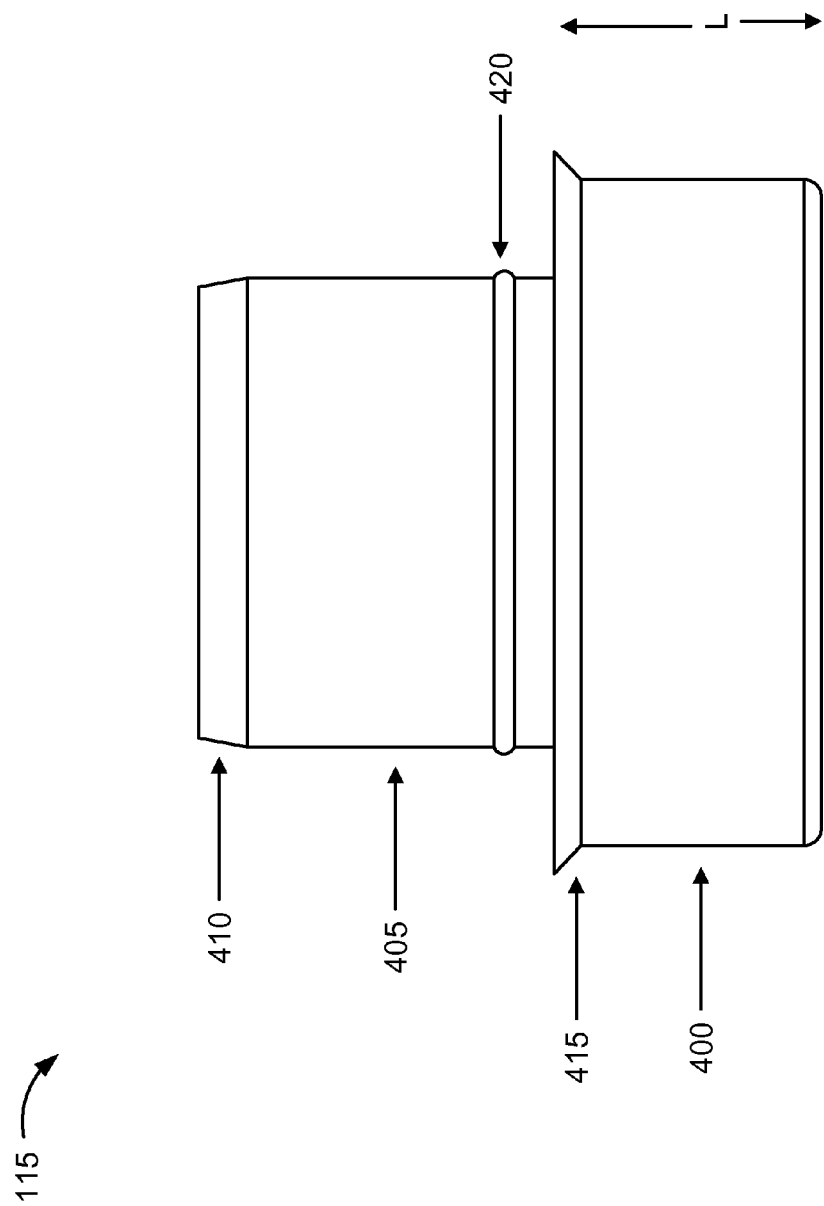

FIG. 4A is a diagram illustrating a side view of an exemplary embodiment of a ground element 115. Ground element 115 may be made from a metal (e.g., steel, etc.). Ground element 115 comprises a ferrule 400 and a tube 405. One end of tube 405 is formed within ferrule 400 and the other end of tube 405 extends beyond the wall of the ferrule 400 and includes a narrowing tapered portion 410. Tapered portion 410 may permit a conduit to more easily slide over tube 405, particularly, during an initial insertion of the conduit and during a remaining removal of the conduit. Ferrule 400 includes an expanding tapered lip portion 415. According to an exemplary embodiment, tube 405 includes a rib 420. Rib 420 protrudes outwardly, in a radial fashion, from tube 405 and provides a frictional engagement when a conduit is inserted over tube 405 or removed from tube 405. According to an exemplary embodiment, rib 405 has an arched or curved to facilitate an insertion of or a removal of the conduit. According to other embodiments, tube 405 may include one or more additional ribs 420. According to other embodiments, rib 420 may be positioned elsewhere relative to tube 405. Rib 420 may also provide grounding for a conduit.

Figure 4B:
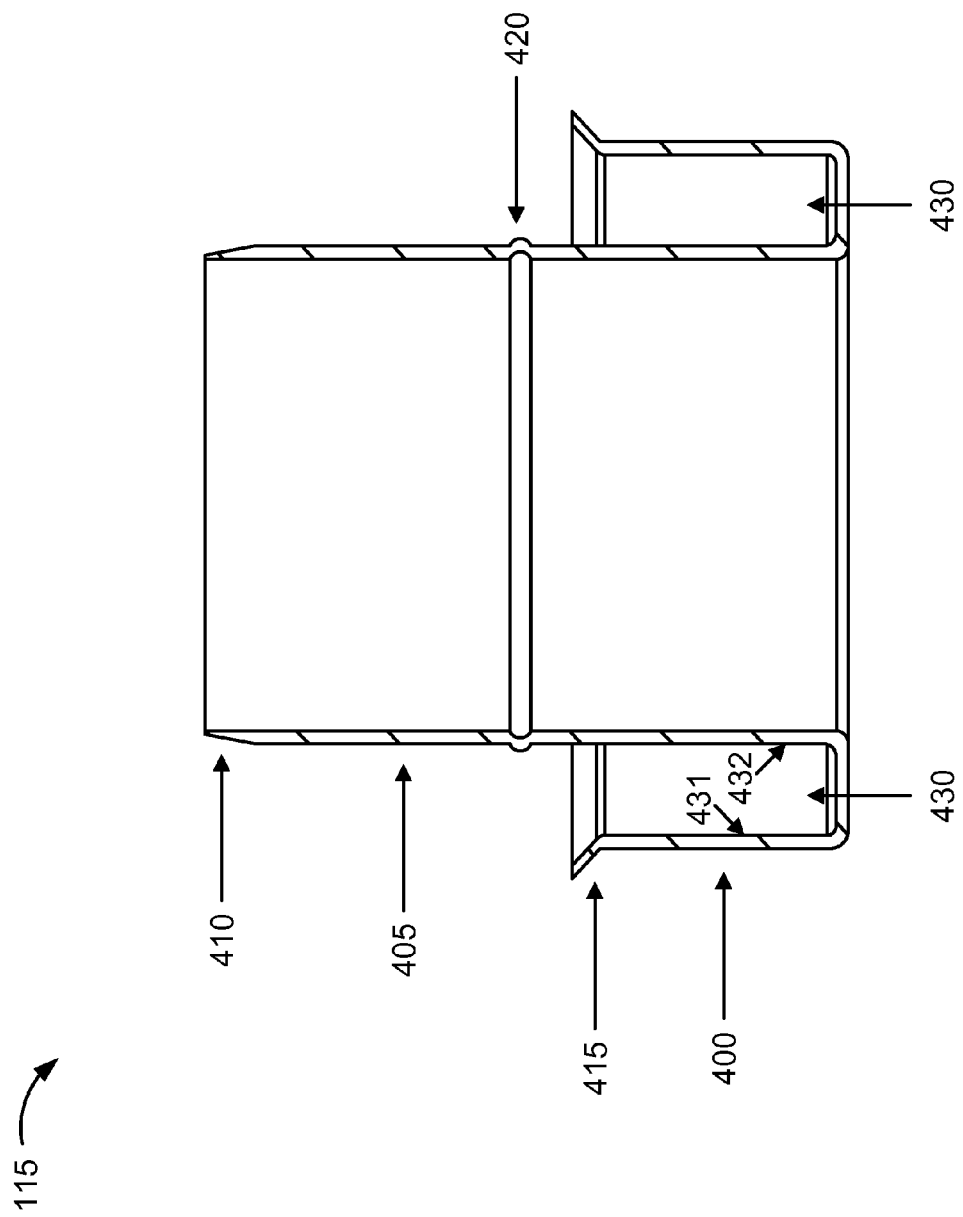

FIG. 4B is a diagram illustrating a cross-sectional view of ground element 115. As illustrated, a space 430 is defined by an inner surface wall 431 of ferrule 400 and an outer surface wall 432 of tube 405. As described further below, an inner surface wall of a conduit is able to slide over outer surface wall 432 of tube 405, when a user inserts the conduit into or removes the conduit from liquid tight-fitting 100.

Figure 4D:
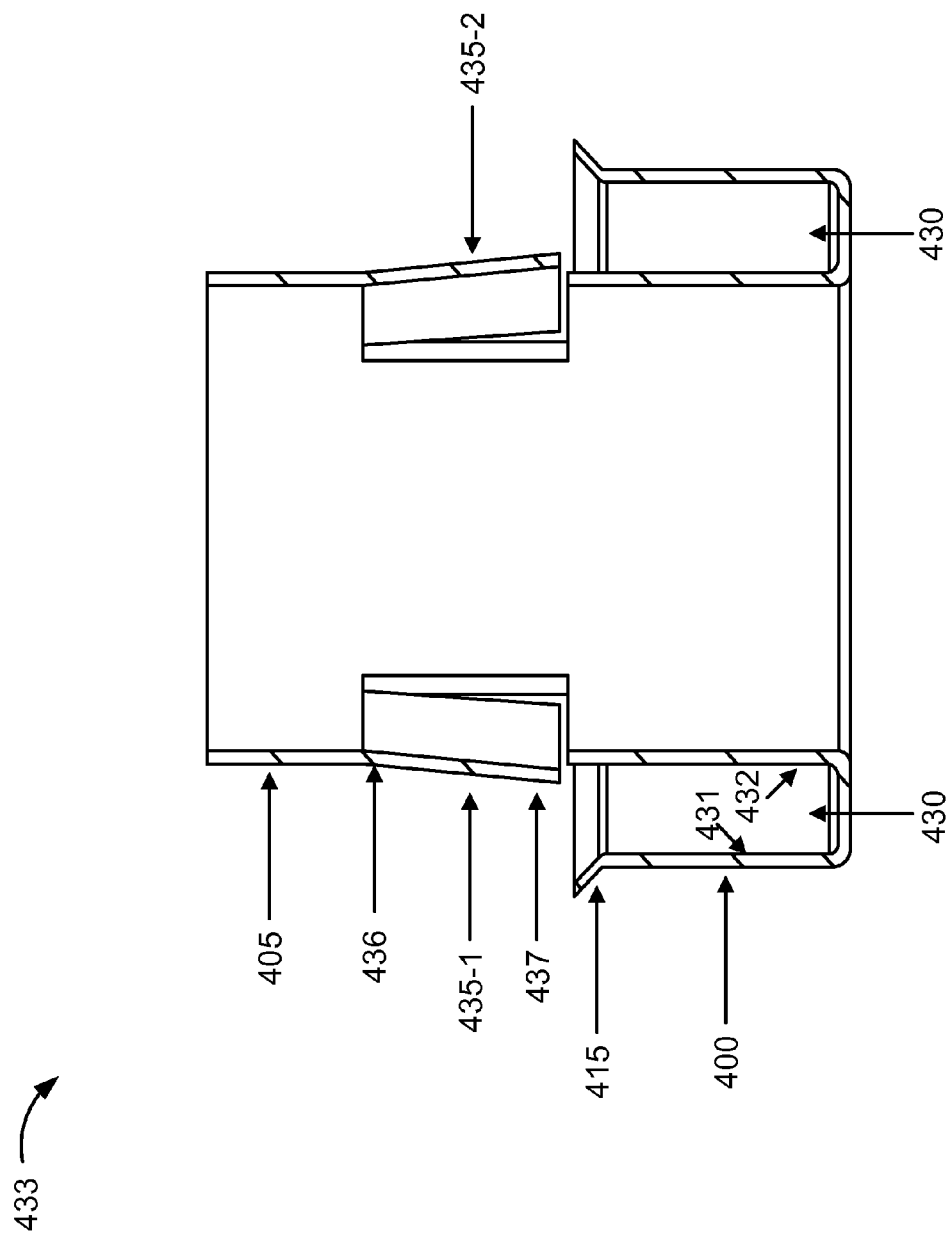

FIG. 4C is a diagram illustrating a side view of another exemplary embodiment of a ground element 433. According to this embodiment, ground element 433 includes tabs 435-1 and 435-2 (also referred to collectively as tabs 435 or individually as tab 435) formed on tube 405. The number of tabs 435 may be greater than two according to other embodiments. Each of tabs 435 includes a first end 436 and a second end 437. As illustrated, each of tabs 435 is flared outward from tube 405 with first end 436 acting as a hinge relative to tube 405. Tabs 435 may be flexible and provide a frictional engagement between a conduit when a user inserts the conduit over tube 405 or removes the conduit from tube 405. Tabs 435 also provide grounding for a conduit. FIG. 4D is a diagram illustrating a cross-sectional view of this embodiment of ground element 115. FIGS. 4E and 4F illustrate other exemplary embodiments of a ground element. For example, as illustrated in FIG. 4E, ground element 440 includes, in addition to tabs 435, tapered portion 410. Referring to FIG. 4F, ground element 445 includes a tab 446. Tab 446 is similar to tab 435, but tab 446 is larger in width and provides a larger surface area of contact with a conduit. Although FIG. 4F illustrates a single tab 446, according to other embodiments, ground element 445 may include two or more of tabs 446.

Figure 4G:
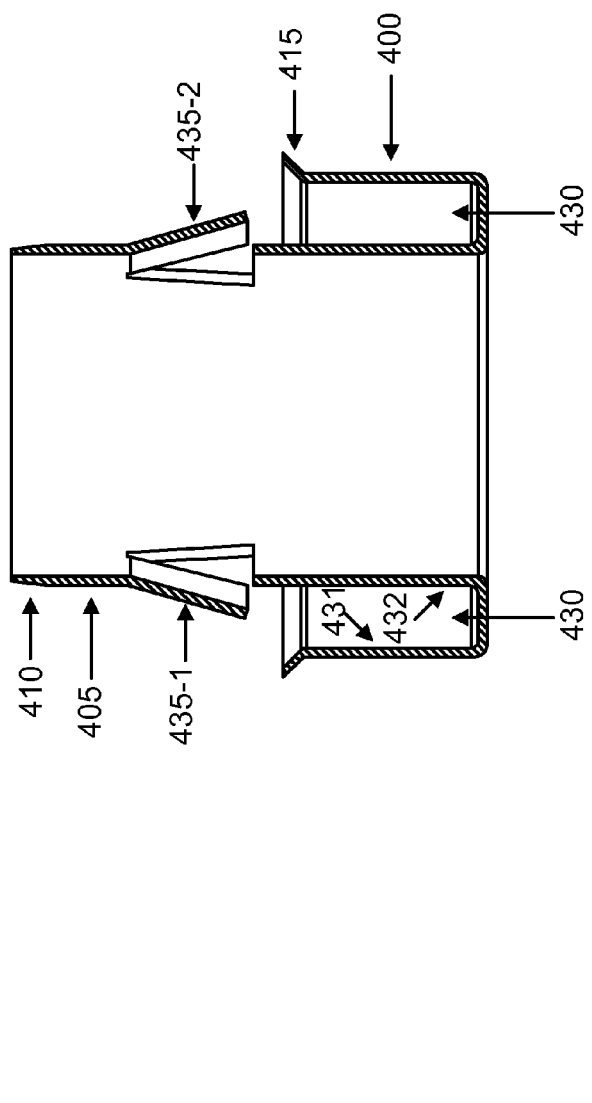
Figure 4H:
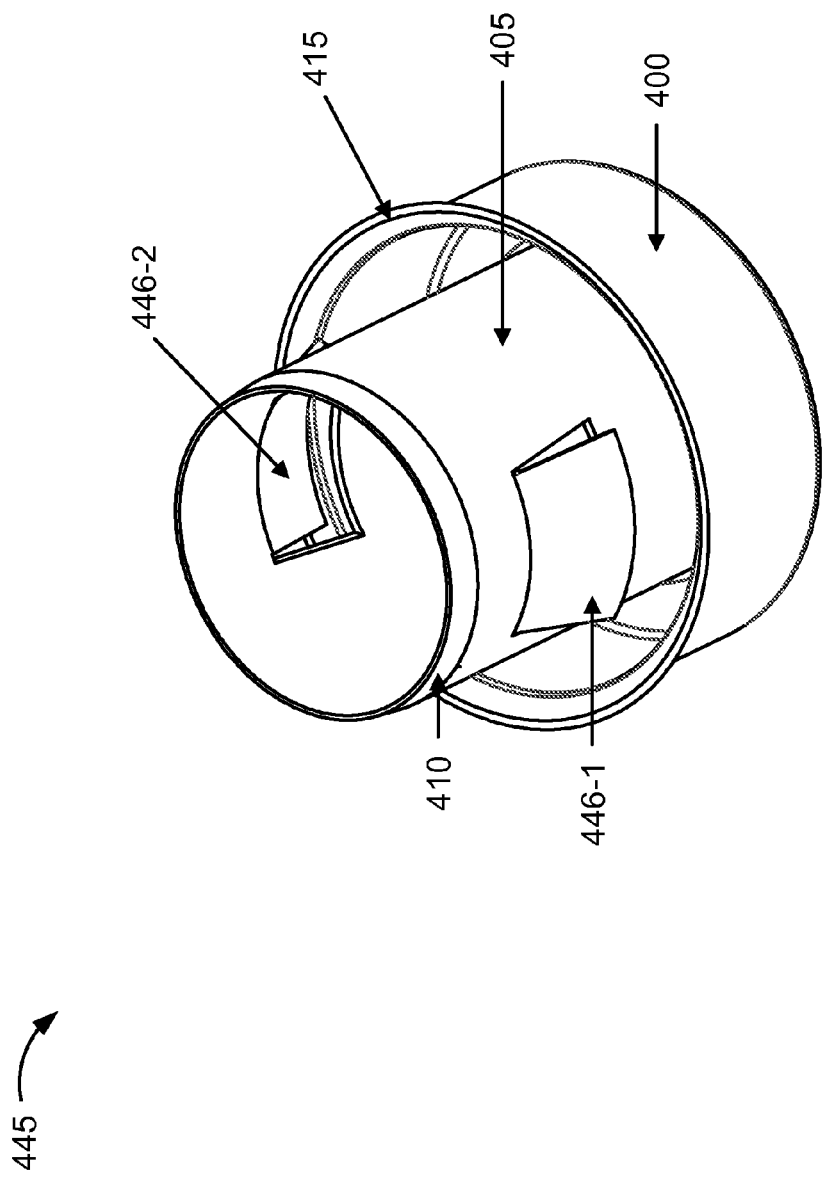

FIG. 4G is a cross-sectional view of ground element 440. FIG. 4H is a diagram illustrating a perspective of ground element 445. FIG. 4I is a diagram illustrating a top view of ground element 445. FIG. 4J is a diagram illustrating another perspective view of ground element 445. Referring to FIG. 4I, an interior wall of tube 405 defines a space 448. As illustrated in FIG. 4J, a wall 447 of ferrule 400 defines an opening associated with space 448. According to an exemplary implementation, the opening is substantially equivalent to a circumference of tube 405. Components of a conduit, such as wires, etc., may extend through ground element 445 within space 448.

FIG. 4K is a diagram illustrating a side view of yet another exemplary embodiment of a ground element 460. According to this embodiment, ground element 460 includes fins 462-1 through 462-3 (also referred to collectively as fins 462 or individually as fin 462) that outwardly project, in a radial fashion, from tube 405. The number of fins 462 is exemplary, and according to other embodiments, the number of fins 462 may be greater than or less than three. Fins 462 may also provide grounding for a conduit. According to an exemplary embodiment, fins 462 include ends 463 that are curved or sloped toward tube 405. The contour of ends 463 may to facilitate an insertion of or a removal of the conduit to/from ground element 460.

Figure 4L:
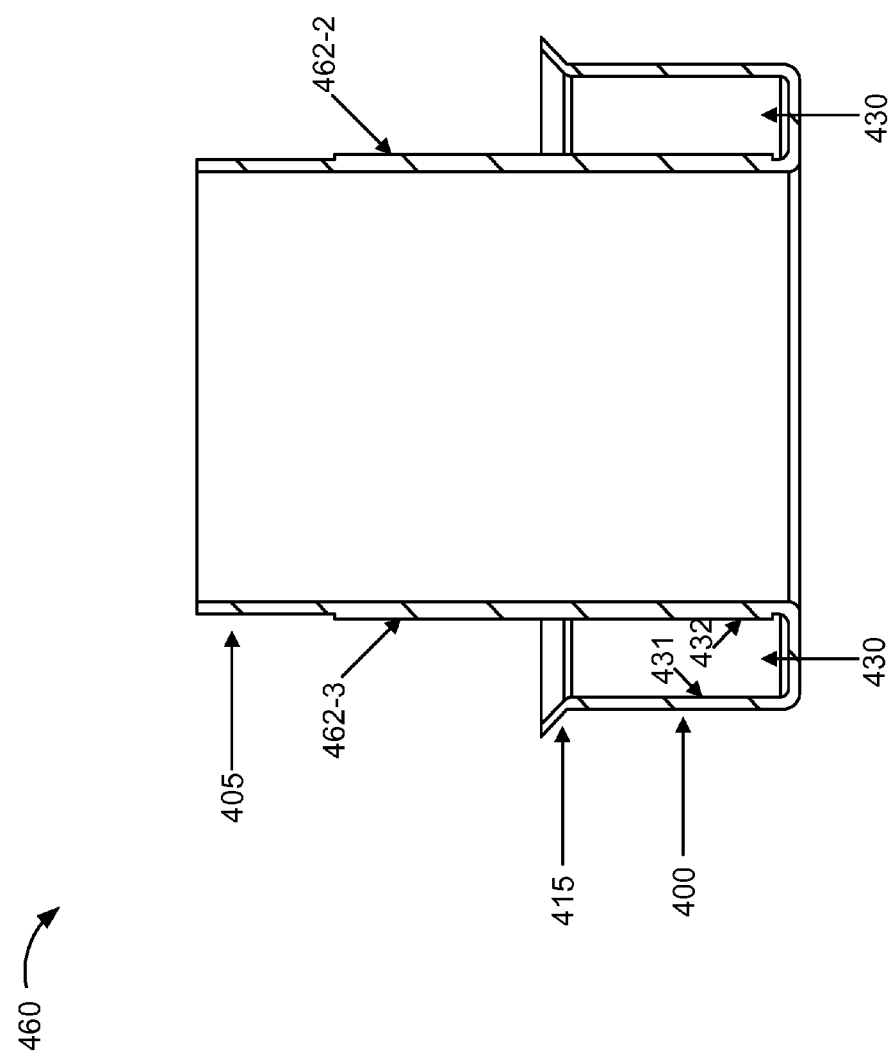

FIG. 4L is a diagram illustrating a cross-sectional view of this embodiment of ground element 460. As illustrated, according to this example, each of fins 462 extends from the base of tube 405, which is formed with ferrule 400.

Figure 5:
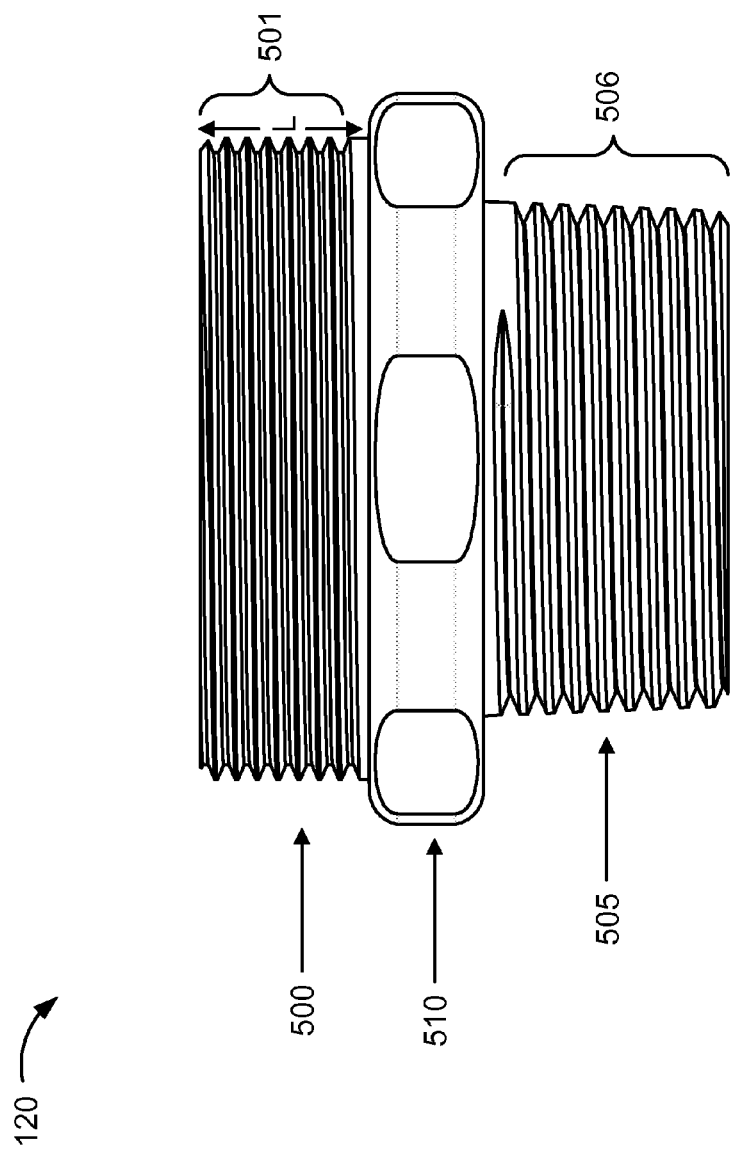
FIG. 5 is a diagram illustrating an exemplary embodiment of a threading element.
Figure 6:
FIG. 6 is a diagram illustrating an exemplary embodiment of a locknut.

FIG. 5 is a diagram illustrating an exemplary embodiment of threading element 120. Threading element 120 may be made from a metal (e.g., steel, etc.). Threading element 120 includes an upper threading portion 500 having threads 501 and a lower threading portion 505 having threads 506. Threading element 120 includes a connecting portion 510. According to an exemplary embodiment, a circumference of upper threading portion 500 is greater than a circumference of lower threading portion 505. As illustrated further below, upper threading portion 500 is configured to receive ground element and a lower threading portion 505 is configured to receive locknut 130. According to an exemplary embodiment, a length L of upper threading portion 500 is substantially equivalent to a length L of the ferrule 400 of ground element 115 (e.g., as illustrated in FIG. 4A). According to other embodiments, such a relationship may not exist. FIG. 6 is a diagram illustrating an exemplary embodiment of a locknut 130. Locknut 130 may be made from a metal (e.g., steel, etc.). Locknut 130 is used to attach liquid-tight fitting 100 to, for example, an enclosure (not illustrated).

Figure 7A:
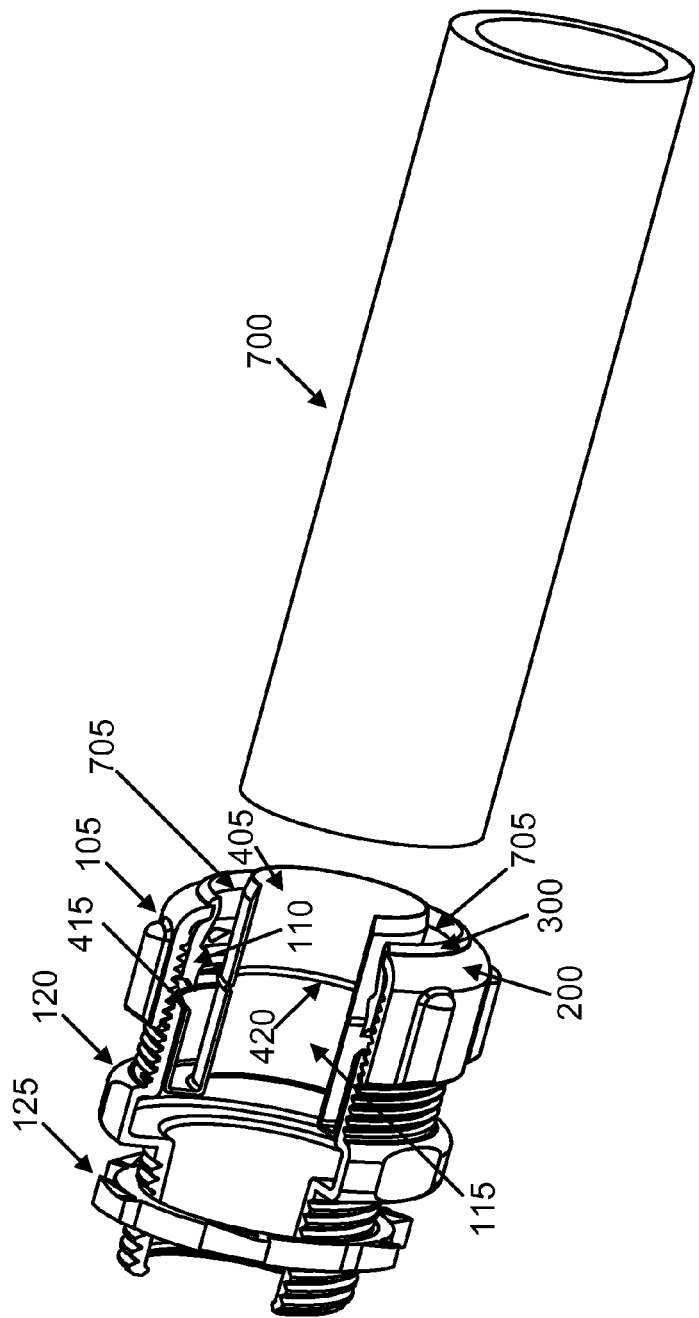
Figure 7B:
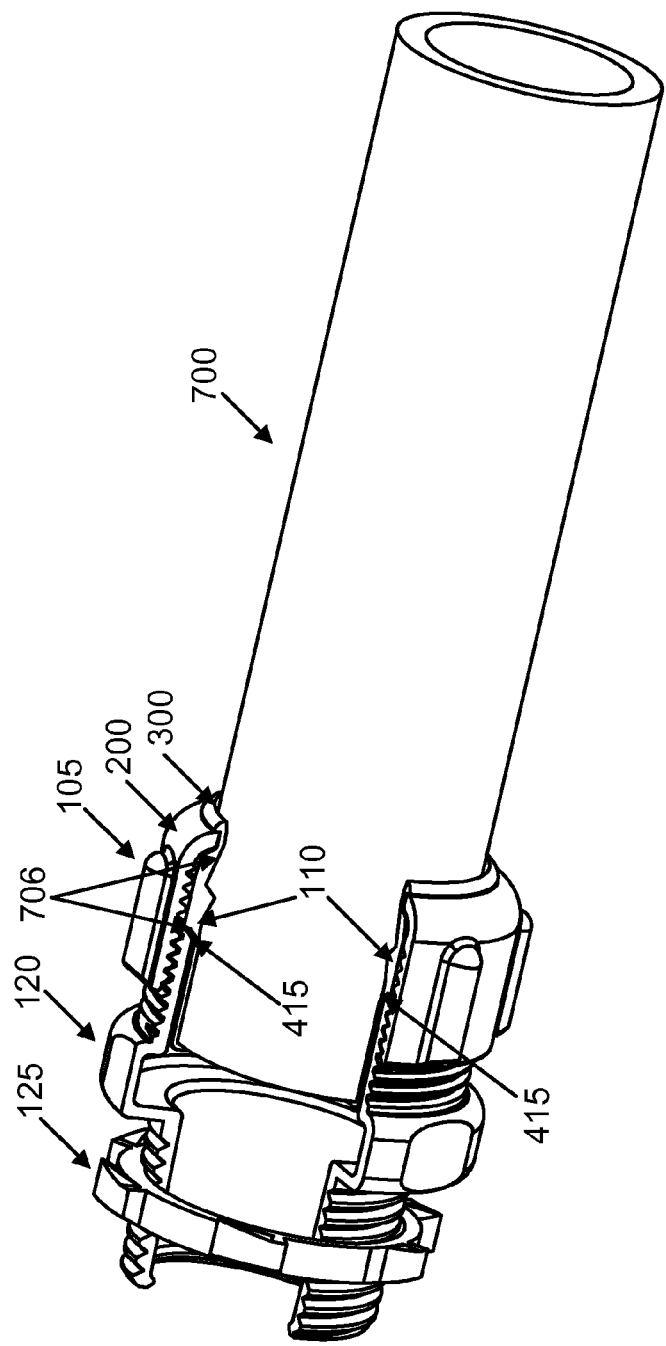

FIGS. 7A and 7B are diagrams illustrating an exemplary embodiment of liquid-tight fitting 100 and a conduit 700. In this example, tube 405 of ground element 115 is depicted to include rib 420. Referring to FIG. 7A, the components of liquid-tight fitting 110 are assembled to receive conduit 700. As illustrated, gland nut 105 is disposed (e.g., threaded) with threads 501 of upper threading portion 500 of threading element 120. Sealing ring 110 is disposed proximate to tube 405 of ground element 115. Sealing ring 110 is also proximate to tapered lip portion 415 of ferrule 400. Lip 300 of sealing ring 110 extends beyond tube 405. Umbrella portion 200 of gland nut 105 is in contact with sealing ring 110. A space 705 is defined by, for example, tube 405, ferrule 400 and sealing ring 110 to permit conduit 700 to be received or pushed in.

Figure 7C:
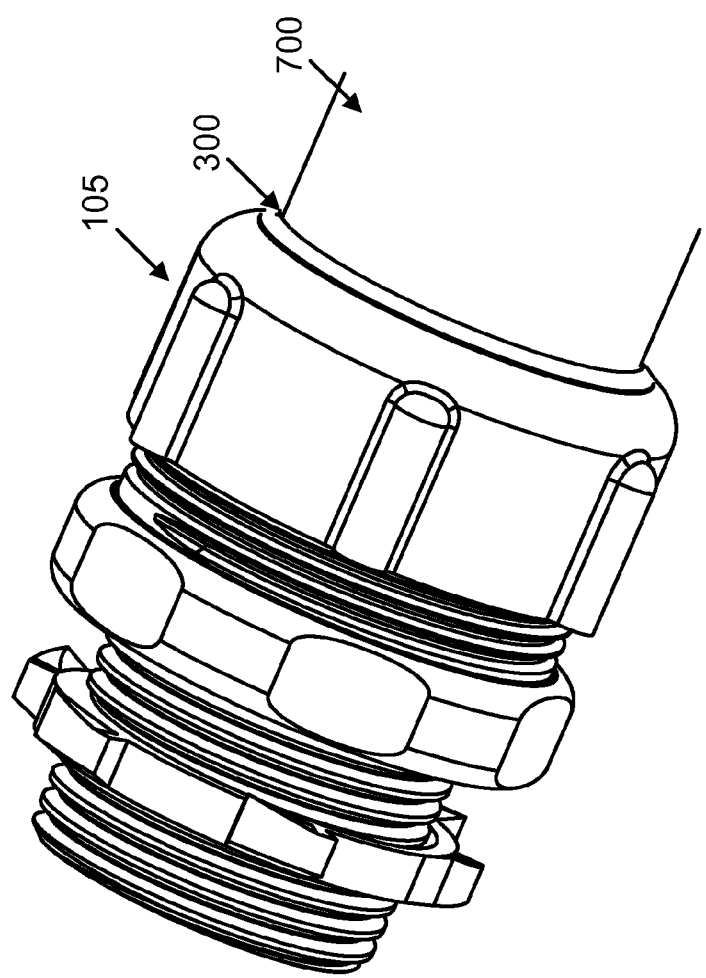

Referring to FIG. 7B, conduit 700 is received by liquid-tight fitting 100. As gland nut 105 is threaded, umbrella portion 200 urges or pulls sealing ring 110 toward tapered lip portion 415 of ferrule 400. A space 706 gradually becomes smaller as gland nut 105 is threaded causing sealing ring 110 to be compressed on conduit 700. According to an exemplary embodiment, teeth 330 of sealing ring 110 are compressed around conduit 700. According to another embodiment, main body portion 360 including ribs 365 of sealing ring 350 is compressed onto conduit 700 and provides a liquid-tight fitting. Additionally, referring to both FIGS. 7A and 7B, as conduit 700 is inserted into space 705 defined by liquid-tight fitting 100, the inner surface of conduit 700 comes into contact with rib 420. Rib 420 provides friction relative to conduit 700 and grounds conduit 700. FIG. 7C is a diagram illustrating liquid-tight fitting 100 assembled with conduit 700.

Figure 7D:
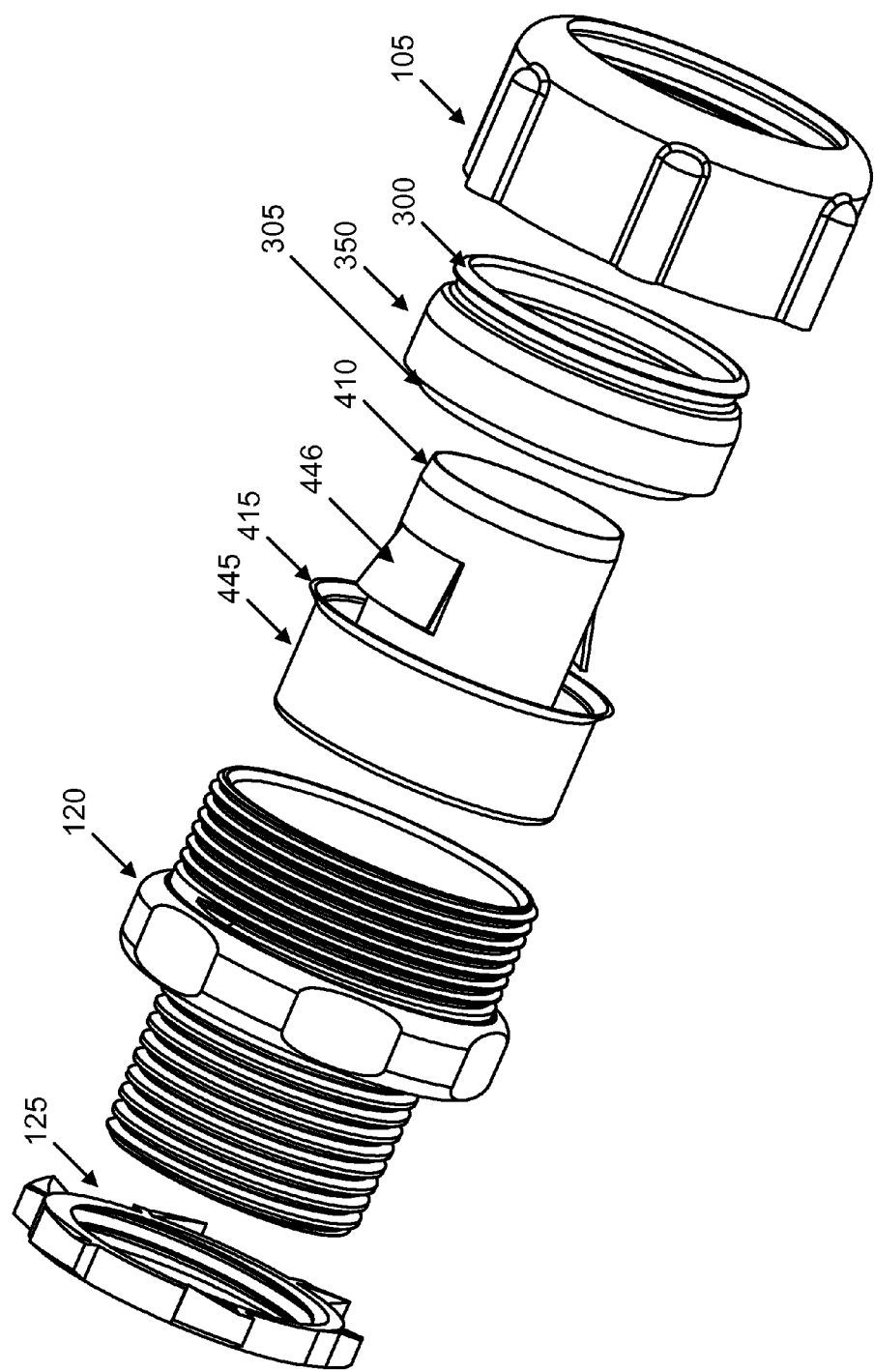
Figure 7E:
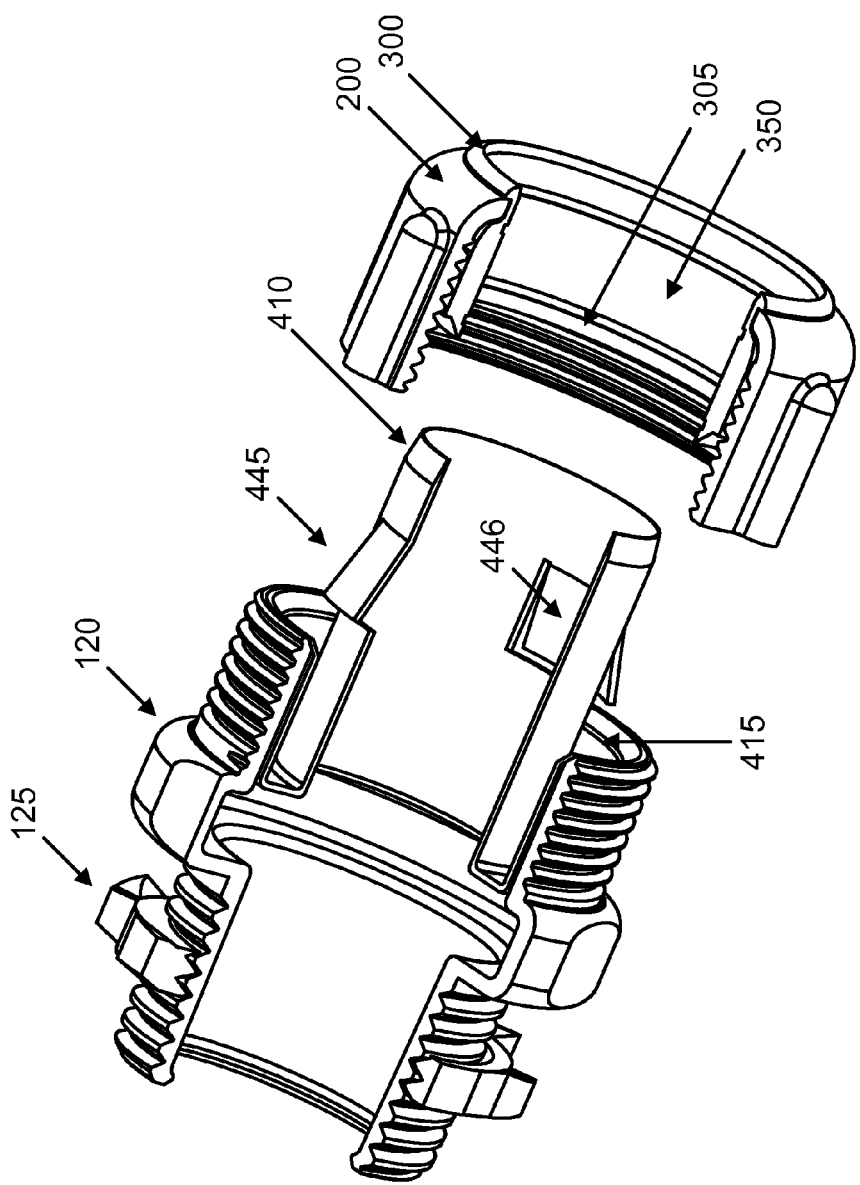
Figure 7G:
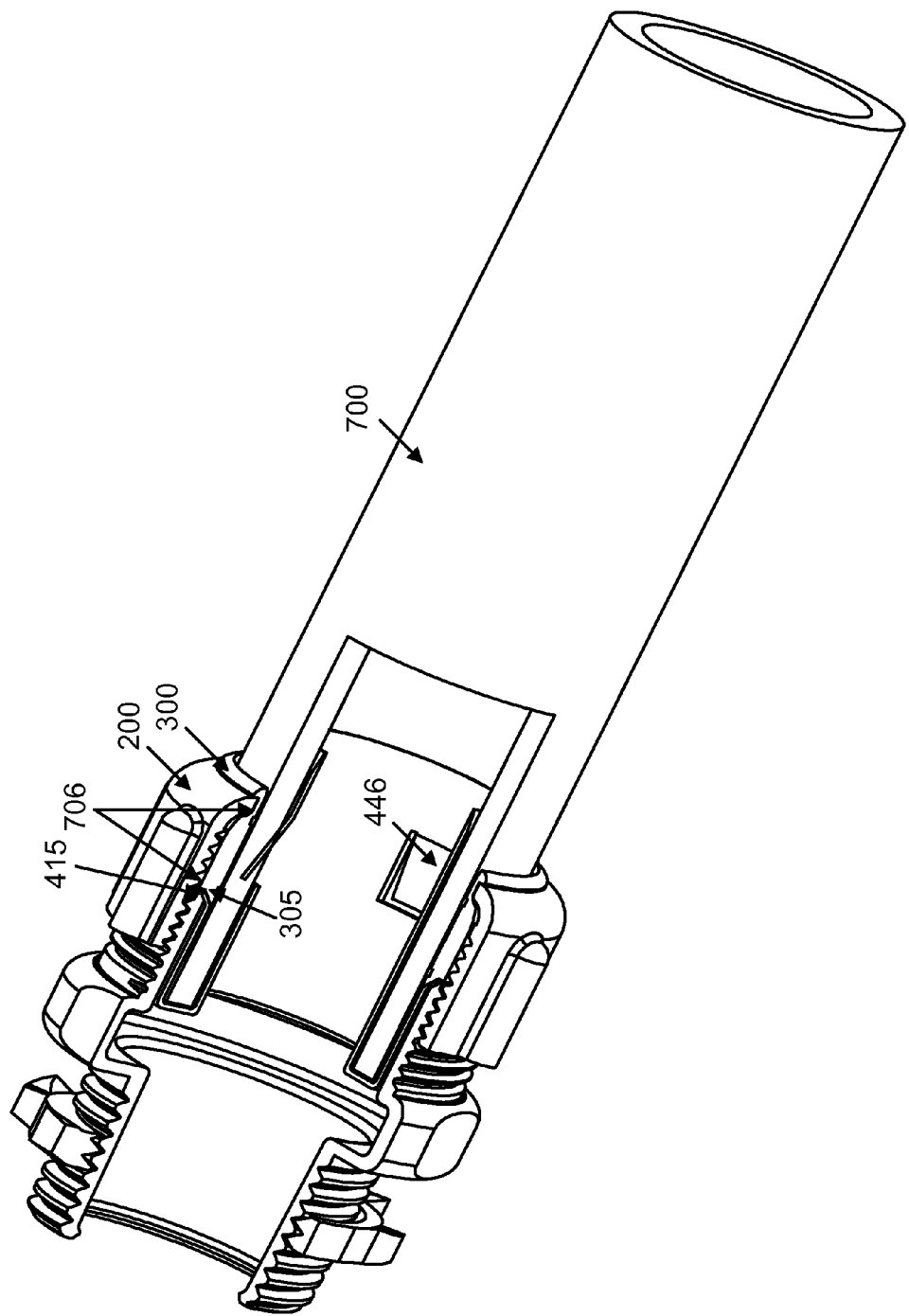

FIG. 7D is a diagram illustrating another exploded view of an exemplary embodiment of liquid-tight fitting. According to this embodiment, liquid-tight fitting includes ground element 445 and sealing ring 350. FIGS. 7E-7G are diagrams illustrating an exemplary assembly of the liquid-tight fitting with a conduit. Referring to FIG. 7F, tapered portion 410 of ground element 445 and a portion of tube 405 extends from the liquid-tight fitting to receive conduit 700. As illustrated in FIG. 7G, tapered portion 305 of sealing ring 350 is seated on tapered lip portion 415 of ferrule 400. As previously described, during the threading of gland nut 105, space 706 is reduced based on umbrella portion of gland nut 105 and a seating of tapered portion 305 of sealing ring 350 on tapered lip portion 415 of ferrule 400, which in turn, causes sealing 350 to compress onto conduit 700. As further illustrated, tab 446 provides friction relative to conduit 700 and grounds conduit 700.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s).

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

What is claimed is:

1. A liquid-tight fitting comprising:
a ground element including a ferrule portion and a tube portion that is configured to receive an inner surface of a wall of a conduit, wherein a first end of the tube portion extends from the ferrule portion, and wherein a second end of the tube portion, which is located at an opposite end relative to the first end, includes an inward tapered portion, wherein a circumference of the inward tapered portion increases as the tube portion extends from the second end, and wherein the tube portion includes one or more protruding elements that each protrudes from the tube portion and provides grounding to the conduit, wherein the one or more protruding elements are located between the first end and the second end of the tube portion, and wherein the ferrule portion includes a lip portion;
a threading element including a first shaft having a circumference sufficient to receive the ferrule portion of the ground element, wherein the first shaft includes threads;
a sealing ring including a first opening having a lip, and a second opening defined by a tapered portion relative to a main body of the sealing ring, wherein the tapered portion is contoured to seat against the lip portion, and wherein a neck of the sealing ring is formed between the lip and the main body and the sealing ring includes teeth disposed on a surface of an inner wall of the sealing ring; and
a nut including threads to be received by the first shaft, wherein an interior wall of the nut is contoured to receive the sealing ring such that the lip of the sealing ring protrudes from an open portion of the nut, and wherein as the nut is continuously threaded with the first shaft of the threading element, the teeth of the sealing ring are compressed onto an outer surface of the wall of the conduit to provide a liquid-tight seal based on the tapered portion of the sealing ring meeting with the lip portion of the ferrule portion and a pulling of the open portion of the nut against the neck of the sealing ring.

2. The liquid-tight fitting of claim 1, wherein the one or more protruding elements include one or more ribs, one or more flexible tabs, or one or more fins.

3. The liquid-tight fitting of claim 2, wherein each of the one or more flexible tabs includes a first end portion that does not protrude from the outer surface of the tube portion and a second end portion, which is opposite to the first end portion, that protrudes from the outer surface of the tube portion.

4. The liquid-tight fitting of claim 1, wherein the teeth are disposed along a circumference of an inner wall of the main body of the sealing ring.

5. The liquid-tight fitting of claim 1, wherein an inner wall surface of the ferrule portion and the outer surface of the tube portion define a space to receive the conduit.

6. The liquid-tight fitting of claim 1, wherein a length of the first shaft is substantially equivalent to a length of a wall of the ferrule portion.

7. The liquid-tight fitting of claim 1, wherein the one or more protruding elements encircle the tube portion parallel to the lip portion of the ferrule portion.

8. A liquid-tight fitting comprising:
a ground element including a ferrule portion and a tube portion that is configured to receive an inner surface of a wall of a conduit, wherein a first end of the tube portion extends from the ferrule portion to a second end of the tube portion, which is located at an opposite end relative to the first end, includes an inward tapered portion, wherein a circumference of the inward tapered portion increases as the tube portion extends from the second end, and wherein the tube portion includes one or more protruding elements that each protrudes from the tube portion and provides grounding to the conduit, wherein the one or more protruding elements are located between the first end and the second end of the tube portion and the one or more protruding elements include one or more flexible tabs or one or more fins, and wherein the ferrule portion includes a lip portion;

a threading element including a first shaft having a circumference sufficient to receive the ferrule portion of the ground element, wherein the first shaft includes threads;

a sealing ring including a first opening, and a second opening defined by a tapered portion contoured to seat against the lip portion, and wherein the sealing ring includes teeth disposed on a surface of an inner wall of the sealing ring; and a nut including threads to be received by the first shaft, wherein an interior wall of the nut is contoured to receive the sealing ring, and wherein as the nut is continuously threaded with the first shaft of the threading element, the teeth of the sealing ring are compressed onto an outer surface of the wall of the conduit to provide a liquid-tight seal based on the tapered portion of the sealing ring meeting with the lip portion of the ferrule portion and a pulling of the nut against the sealing ring.

9. The liquid-tight fitting of claim 8, wherein the first opening of the sealing ring includes a lip, and the lip protrudes from an opening of the nut when the sealing ring is compressed onto the outer surface of the wall of the conduit, and the lip fits around the outer surface wall of the conduit.

10. The liquid-tight fitting of claim 9, wherein each of the one or more flexible tabs includes a first end portion that does not protrude from the outer surface of the tube portion and a second end portion, which is opposite to the first end portion, that does protrude from the outer surface of the tube portion.

11. The liquid-tight fitting of claim 8, wherein the one or more protruding elements encircle the tube portion parallel to the lip portion of the ferrule portion.

12. The liquid-tight fitting of claim 11, wherein the tapered portion of the sealing ring is inwardly tapered and the lip portion of the ferrule portion is outwardly tapered.

13. The liquid-tight fitting of claim 8, wherein the first opening of the sealing ring includes a lip, and a neck of the sealing ring is formed between the lip and a main body of the sealing ring, and wherein the teeth are disposed along a circumference of an inner surface wall of the main body.

14. The liquid-tight fitting of claim 8, wherein the nut includes an umbrella-shaped portion that defines an opening and the sealing ring includes a lip portion that protrudes from the opening and fits around the outer surface of the wall of the conduit.

15. The liquid-tight fitting of claim 8, wherein the ferrule portion includes a wall that defines an opening substantially equivalent to a circumference of the tube portion.

16. The liquid-tight fitting of claim 8, wherein a wall of the ferrule portion and the tube portion define a space to receive the conduit.

17. A liquid-tight fitting comprising:

a ground element including a ferrule portion and a tube portion that is configured to receive an inner surface of a wall of a conduit, wherein a first end of the tube portion extends from the ferrule portion, and wherein a second end of the tube portion, which is located at an opposite end relative to the first end, includes an inward tapered portion, wherein a circumference of the inward tapered portion increases as the tube portion extends from the second end, and wherein the tube portion includes one or more protruding elements that each protrudes from the tube portion and provides grounding to the conduit, wherein the one or more protruding elements are located between the first end and the second end of the tube portion, and wherein the ferrule portion includes a lip portion;

a threading element including a first shaft having a circumference sufficient to receive the ferrule portion of the ground element, wherein the first shaft includes threads;

a sealing ring including an opening defined by a tapered portion to seat against the lip portion and teeth disposed on a surface of an inner wall of the sealing ring; and a nut including threads to be received by the first shaft, wherein an interior wall of the nut is contoured to receive the sealing ring, and wherein as the nut is threaded with the first shaft, the sealing ring is compressed onto the conduit to provide a liquid-tight seal, wherein a compression of the sealing ring is based on a pulling of the nut against the sealing ring toward the lip portion of the ferrule portion.

18. The liquid-tight fitting of claim 17, wherein the one or more protruding elements include one or more ribs, one or more flexible tabs, or one or more fins.

19. The liquid-tight fitting of claim 18, wherein the one or more ribs encircle the tube portion parallel to the lip portion of the ferrule portion, and wherein the teeth are U-shaped.

20. The liquid-tight fitting of claim 17, wherein the nut includes an umbrella-shaped portion that defines an opening and the sealing ring includes a lip portion that protrudes from the opening and fits around the conduit.

* * * * *